Jan. 10, 1928.
R. F. SCHALLER ET AL
1,655,846
MACHINE FOR MAKING QUARTZ GLASS RODS AND TUBES
Filed Feb. 20, 1926  3 Sheets-Sheet 1
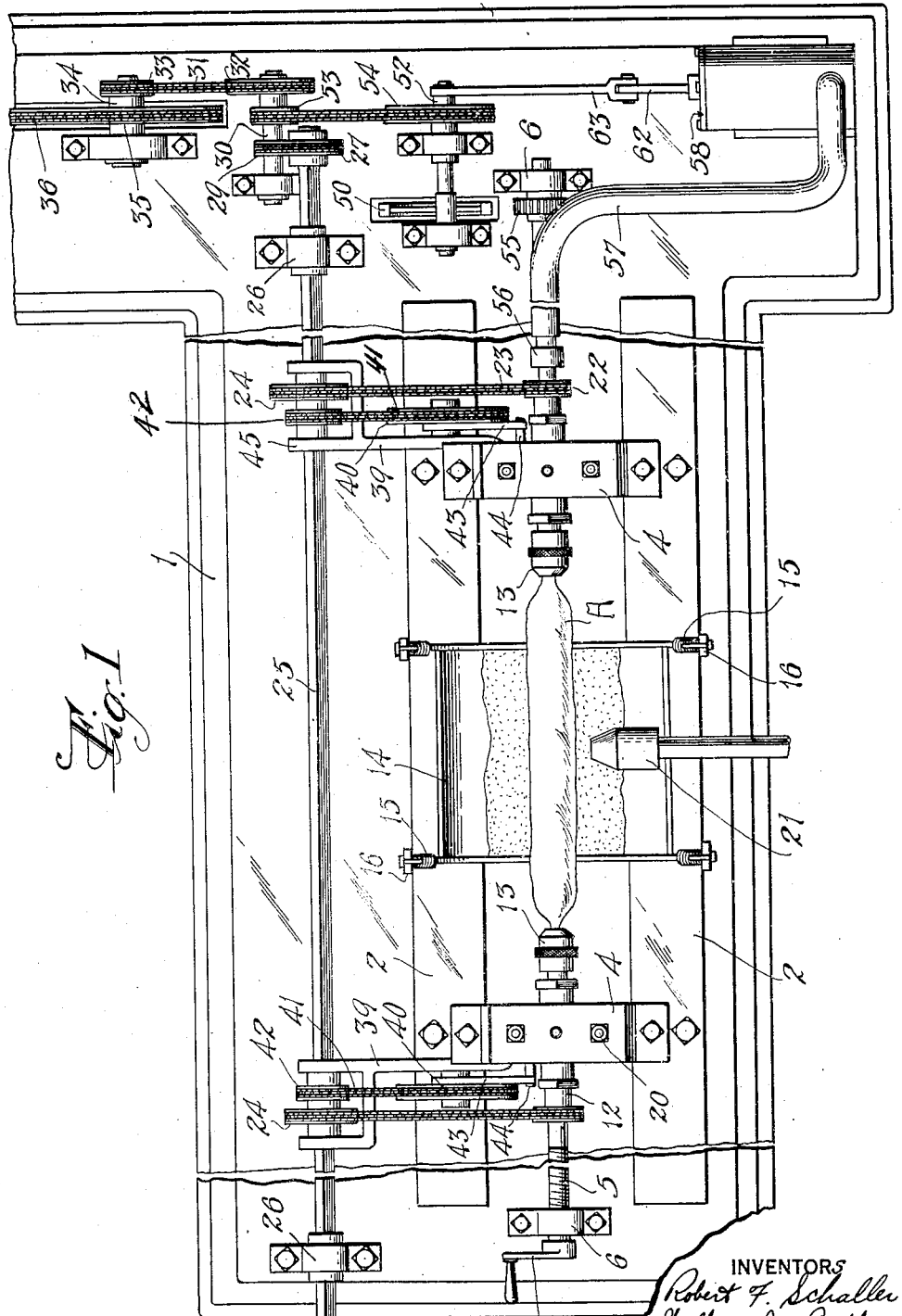

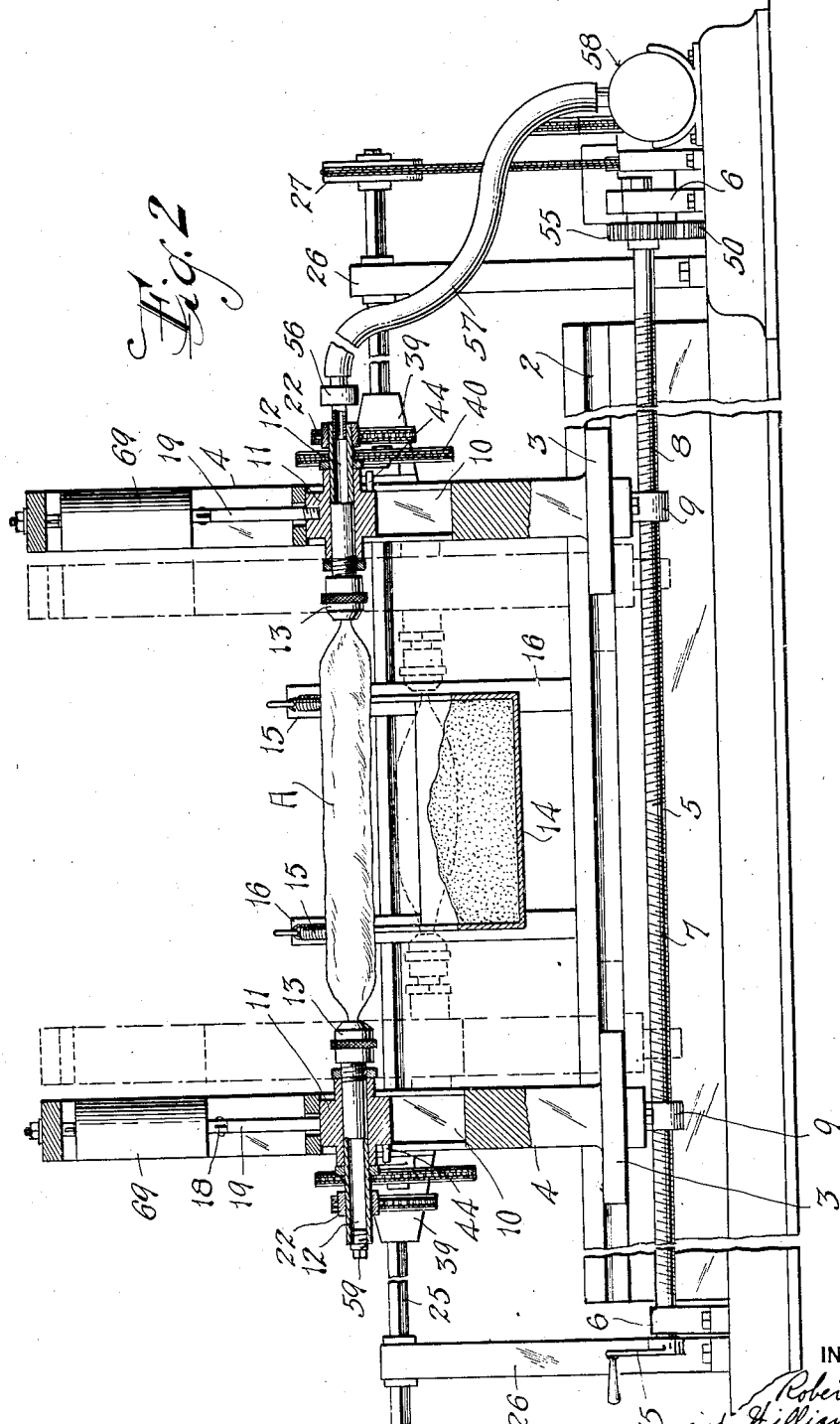

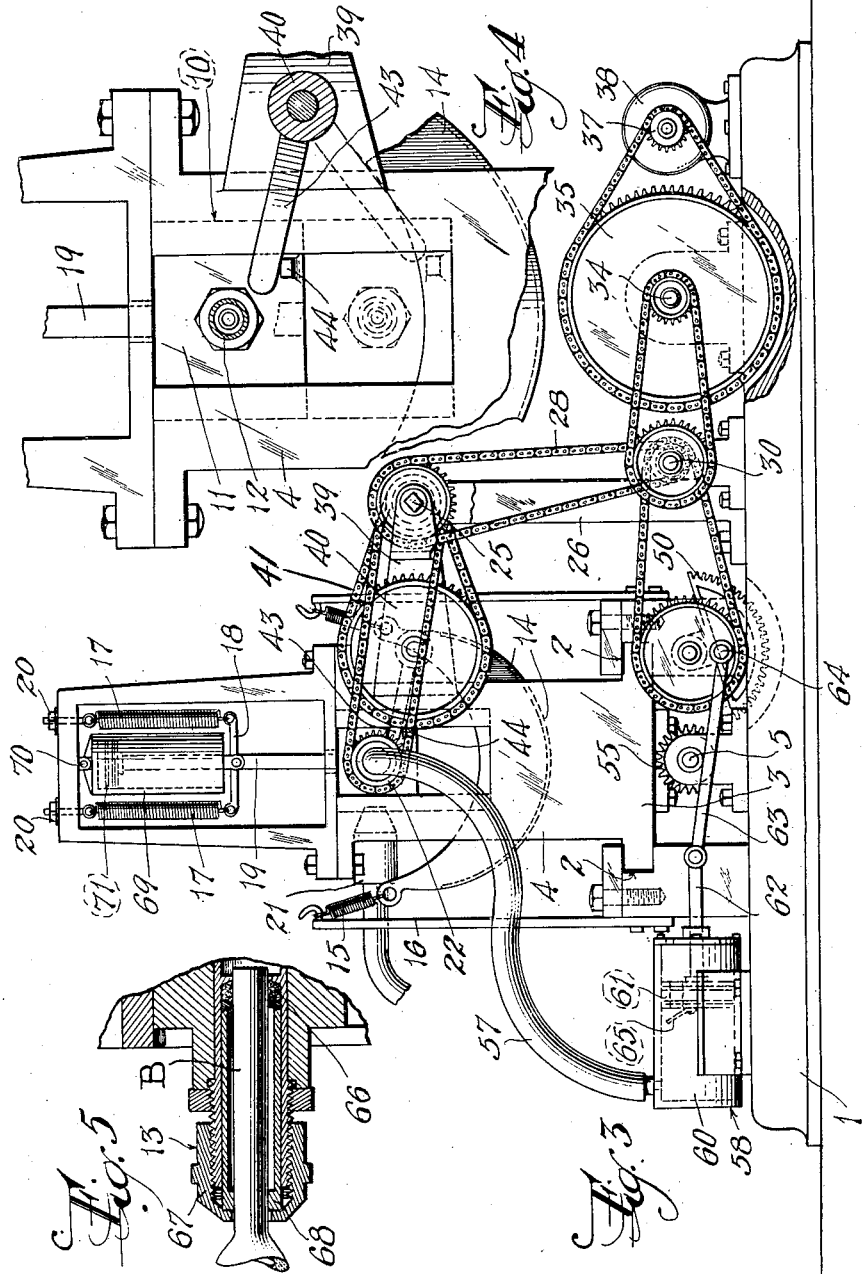

Patented Jan. 10, 1928.

1,655,846

UNITED STATES PATENT OFFICE.

ROBERT F. SCHALLER, OF RAHWAY, AND WILLIAM J. LIDLE, OF NEWARK, NEW JERSEY.

MACHINE FOR MAKING QUARTZ-GLASS RODS AND TUBES.

Application filed February 20, 1926. Serial No. 89,657.

This invention relates to a machine for making or building up a rod or tube of quartz glass, and more particularly to the manufacture of a rod or tube from powdered quartz.

Quartz rods or tubes have been made by heating a nucleus of quartz to a plastic state, rotating the heated nucleus into contact with quartz powder so that an accretion of the powder surrounds and adheres to the nucleus, and then reheating the nucleus and the adherent powder to a plastic state so that the powder becomes fused and incorporated into the nucleus as an integral part thereof. While the nucleus is in a plastic state after the accretion has been fused, the whole plastic mass is stretched or elongated. When a tube is to be made, the nucleus is in the form of a tube and compressed air is supplied to the interior of the tube while the tube is in plastic state, to prevent collapsing, thickening or deformation of the walls of the tube.

One object of the present invention is to provide a novel and improved machine for making quartz rods or tubes according to the above described method, by which all steps in the method except the insertion of the nucleus and the removal of the finished object, are automatically performed so that the manufacturing process involves a minimum of labor and time and the finished product is of high quality.

Another object is to provide in such a machine novel and improved means for applying the powdered quartz to the heated nucleus whereby the quartz powder is evenly distributed upon the nucleus and without waste of the quartz powder or possibility of injury to the nucleus.

Other objects are to provide means for periodically moving the nucleus into and out of contact with the quartz powder and simultaneously rotating the nucleus; to provide a novel and improved support or container for the quartz powder to cooperate with said means for moving the nucleus whereby proper contact of the nucleus with the quartz powder is ensured; to provide a simple and inexpensive construction, and to obtain other results and advantages as may be brought out by the following description.

Referring to the accompanying drawings, in which corresponding and like parts are designated throughout the several views by the same reference characters, Figure 1 is a top plan view of a machine embodying the invention;

Figure 2 is a vertical longitudinal sectional view through the nucleus supporting and actuating carriages;

Figure 3 is an end elevation of the machine;

Figure 4 is an enlarged fragmentary end elevation of one of the standards on the nucleus supporting carriages showing the mechanism for moving the nucleus into contact with the quartz powder, and, Figure 5 is an enlarged longitudinal vertical sectional view through one of the chucks for holding the nucleus.

Specifically describing the illustrated embodiment of the invention, the reference character 1 designates the base of the machine on which are mounted spaced and parallel guideways 2 for a pair of spaced nucleus supporting carriages 3 which are provided with vertical standards 4. The carriages 3 are movable toward and from each other in the guideways 2, and any suitable means may be utilized for so moving the carriages. Preferably a rod 5 is rotatably mounted in bearings 6 between the guideways 2, opposite end portions of said rod being right and left-hand threaded as at 7 and 8, respectively, and passing through correspondingly threaded projections 9 on the bottoms of the carriages 3, so that rotation of the rod 5 in one direction causes the carriages to move toward each other, while when the rod is rotated in the other direction the carriages are moved apart.

Vertically slidable in guideways 10 in the respective standards 4 are blocks 11 in which are journaled on horizontal axes parallel with the rod 5 shafts 12. On the inner ends of the shafts 12, that is on the ends of the shafts projecting from the adjacent faces of the standards 4, are chucks 13 for supporting a nucleus of quartz glass A. Substantially centrally between the standards 4 is arranged a pan or other suitable support 14 for quartz powder, said pan being so located that when the blocks 11 are moved downwardly in the guideways 10, the nucleus A is caused to contact with the powder in the pan. Preferably, the pan is mounted by springs 15 upon vertical standards 16 so that the pan may yield away from the nucleus to ensure proper contact of the nucleus with the powder and prevent injury to the nucleus. The blocks 11 are normally held at the upper ends of the guideways 10 by tension springs 17 connected by a cross-head 18 to a rod 19 extending upwardly from the corresponding block 11. The tension of the springs 17 is adjustable by means of bolts and nuts 20 mounted at the upper ends of the standards 4, as clearly shown in Figure 3 of the drawings.

A gas burner or other suitable heater 21 is disposed at one side of the axis of the shaft 12 so that the flame from the burner is directed substantially horizontally upon one side of the nucleus A when it is mounted in the chucks 13. This burner serves to heat the nucleus to a plastic state, and the nucleus is constantly rotated through the burner flame so that all parts of the central portion of the nucleus are uniformly heated.

Any suitable means may be utilized for constantly rotating the nucleus and for periodically moving it into contact with the quartz powder in the pan 14. Preferably, such means includes sprockets 22 fast on the shafts 12 at the sides of the standards 4 opposite the chucks 13, said sprockets being connected by chains 23 to sprockets 24 mounted upon a square shaft 25 journaled in bearings 26 extending vertically from the base 1. The horizontal axial plane of the shaft 25 is preferably substantially equidistant between the limits of movement of the blocks 11 so that the same tension upon the chains 23 obtains when the blocks are at their opposite limits of movement. The shaft 25 is driven by a sprocket 27 connected by a chain 28 to another sprocket 29 on a countershaft 30 journaled upon the base 1, and said countershaft is driven by a chain 31 and sprockets 32 and 33 from another countershaft 34 which is in turn driven by a sprocket 35 and a chain 36 connected to a sprocket 37 on the shaft of an electric motor 38. Accordingly, the chucks 13 and the nucleus A are constantly rotated through the gearing above described by the motor 38. A bracket arm 39 extends laterally from each of the standards 4 and has journaled thereon a sprocket 40 connected by a chain 41 to another sprocket 42 on the shaft 25. In fixed relation to the sprocket 40 is an arm 43 adapted to periodically engage a lug 44 projecting from the face of the corresponding block 11 so that once during each rotation of the sprocket 40 and arm 43, said arm engages the lug 44 and moves the corresponding block 11 downwardly in the corresponding guideway 10, as shown in Figure 4 of the drawings, so that the nucleus A contacts with the quartz powder in the pan 14. The engagement of the arm 43 with the lug 44 is such that when the block 11 has been moved to its lower limit the arm tangentially releases itself from the lug 44 and permits the spring 17 to return the block to its normal upper position. To prevent the blocks 11 from being returned by the spring 17 with a snap action which might injure the nucleus A, we may utilize a dash pot which comprises a cylinder 69 having its closed end pivotally mounted at 70 at the upper end of the corresponding standard 4 and having loosely reciprocable therein a piston 71 connected to the rod 19 projecting from the block 11. Obviously, the piston 71 will be moved outwardly of the cylinder 69 when the block 11 is moved to its lower position, and the air in the cylinder behind the piston 71 will retard the return of the block 11 to its upper position and cause a smooth cushioned movement of the block. Obviously, the arms 43 move synchronously so that both blocks 11 are simultaneously moved, and similarly the chucks 13 are moved at the same rate of speed to prevent torque on the nucleus. The outer ends of the bracket arms 39 are forked as at 45 and the arms of the fork are disposed at opposite sides of the sprockets 24 and 42 so that said sprockets are caused to slide upon the shaft 25 when the carriages 3 are moved toward or from each other.

The nucleus in its initial form is substantially as illustrated in dot and dash lines in Figure 2 of the drawings and the carriages 3 are in the positions shown by dot and dash lines. When the nucleus A has been heated to a plastic state and is moved into contact with the quartz powder as above described, some of the powder adheres to the plastic surface of the nucleus. After the quartz powder has been thus applied to the nucleus, the latter is returned to its normal position in the path of the flame from the burner 21 so that the powder is fused and incorporated into the nucleus. The nucleus is then elongated or stretched, the accretion of powder thus compensating for the stretching or elongation of the nucleus. The elongating of the nucleus is accomplished by movement of the carriages apart, and this operation is preferably performed by a gear segment 50 mounted on a countershaft 52 which is driven by sprockets 53 and 54 from the counter-shaft 30, said gear segment being arranged to mesh with a pinion 55 fast on the rod 5. With this construction, when the gear segment meshes with the pinion 55, the rod 5 is rotated to separate the carriages 3. The length of the segment and the pitch of the threads 7 and 8 on the rod 5 are such that the nucleus is elongated a predetermined amount which will properly compensate for the increment of quartz powder previously added to maintain the nucleus of substantially uniform cross-section. Also, the time of engagement of the gear segment 50 with the pinion 55 is so related to the movement of the nucleus A as to elongate the nucleus at the proper time.

Where the finished product is to be a quartz glass tube, the initial nucleus A is in the form of a tube, and means is provided for preventing collapse or deformation of the walls of the nucleus during contact thereof with the quartz powder and during the stretching operation. For this purpose, the shafts 12 may be tubular and one end of one thereof connected through a swivel 56 to a flexible tube 57 which is in turn connected to the outlet of a pump 58. The end of the other shaft 12 opposite the corresponding chuck 13 is preferably closed as by a plug 59. The pump may be of any suitable construction but is shown as comprising a cylinder 60 in which is reciprocable a piston 61 the piston rod 62 of which is connected by a connecting rod 63 to a crank pin 64 on the sprocket 54. The pump piston 61 has a suitable valve 65 so that upon movement of the piston inwardly of the cylinder air is compressed and forced into the nucleus A, while when the piston is moved in the other direction the pressure of the air in the nucleus is reduced. The relation of the crank pin 64 to the other gearing is such that the air is compressed during the contact of the nucleus with the quartz powder and during the elongating operation. The compressed air serves as an internal support for the walls of the nucleus to prevent the latter from becoming deformed or from collapsing. To provide air tight joints between the nucleus and the chucks, we may utilize a chuck as shown in Figure 5 of the drawings and which includes a packing gland 66 through which passes the reduced end B of the nucleus and which is tightened as the clamping sleeve 67 of the chuck is tightened to secure the nucleus between the jaws 68 of the chuck. The clamping jaws 68 and sleeve 67 may be of known construction.

In operation of the machine, the carriages 3 are moved toward each other and a nucleus substantially as shown by dot and dash lines in Figure 2 mounted in the chucks 13. The necessary adjustment of the carriages may be accomplished by manual rotation of the rod 5 through a handle 75, the gear segment 50 being normally out of mesh with the pinion 55. The nucleus having been adjusted, the burner is started in operation and also the motor 38, whereupon the nucleus is rotated. When the nucleus has been heated to a plastic state, the arms 43 move the blocks 11 downwardly to cause contact of the nucleus with powdered quartz, and substantially simultaneously the pump 60 compresses the air within the nucleus. When the arms 43 release the blocks, the nucleus is again returned to the zone of the burner flame and heated so that the accretion of quartz powder is fused and incorporated into the nucleus. The gear segment 50 then engages the pinion 55 to rotate the rod 5 and separate the carriages so as to elongate the nucleus. This sequence of operations is repeated until a quartz tube of the desired length has been produced.

It will be noted that the shafts 12 move in a common axial plane and that the pan 14 intersects the plane of movement of the shafts. The burner 21 is at one side of said plane of movement and preferably stationary, and it will be noted that the nucleus is moved out of the flame of the burner at the same time as the nucleus is moved into contact with the quartz powder. Also the pan 14 for the quartz powder is stationary so that only one movement, that of the nucleus, serves both purposes, that is, to move the nucleus away from the burner and to move the nucleus into contact with the quartz powder. The springs 15 prevent too much pressure being exerted upon the nucleus as the nucleus moves through the powder, and at the same time ensure a sufficient and uniform pressure to cause even and uniform distribution of the powder upon the nucleus.

We are aware of such machines as shown by Patent No. 1,314,212 dated August 26, 1919, and do not desire to be understood as attempting to claim such a construction. While we have shown and described our invention as embodied in certain details of construction, it will be understood that this is primarily for the purpose of illustrating the principles of the invention and that the details of construction may be modified and changed by those skilled in the art without departing from the spirit and scope of the invention. Therefore, we do not desire to be understood as limiting ourselves except as required by the following claims when construed in the light of the prior art.

Having thus described the invention, what we claim is:

1. A machine for making a hollow object of quartz glass, comprising a pair of spaced carriages movable toward and from each other and having alined supports movable in a common axial plane one of which is tubular, means at the facing ends of said supports for engaging and supporting a hollow nucleus of quartz glass, means at one limit of movement of said nucleus for heating the same to plastic state, a receptacle for powered quartz at the other limit of movement of the nucleus, means for moving said supports to move said nucleus from said heating means into contact with said powered quartz, means for actuating said supports to return said nucleus and accretion of powered quartz to said heating means to fuse and incorporate said accretion into said nucleus, said carriages having threaded openings, a threaded shaft fitted in said openings so that rotation of said shaft moves said carriages toward and from each other, a pinion on said threaded shaft, a gear segment to mesh with said pinion to periodically rotate said shaft and move said carriages a predetermined distance, means for rotating said gear segment, means for rotating said supports, an air pump, a flexible tube connecting said pump and said tubular support, and an operative connection between said pump and said means for rotating said gear segment so related to the actuation of said supports that the air in said hollow nucleus is compressed during the contact of said nucleus with said powered quartz and while said nucleus is being elongated.

2. A machine for making an object of quartz glass, comprising a pair of spaced carriages movable toward and from each other, a pair of blocks movable upon said carriages in a common vertical plane, a pair of axially alined shafts journaled in said blocks, means upon the facing ends of said shafts for engaging and supporting a nucleus of quartz glass between them, means for heating said nucleus to plastic state at one limit of movement of the nucleus, a receptacle for quartz powder adjacent the other limit of movement, each of said blocks having a lug thereon, a rotating arm mounted on each of said carriages to engage the respective said lug once during each rotation of the arms to move the respective block, means for rotating said arms in synchronism so that said blocks are simultaneously actuated to move said nucleus from said heating means into contact with said quartz powder, means for simultaneously rotating said shafts, means for actuating said blocks to move said nucleus away from said quartz powder to said heating means so that the quartz powder accretion is fused and incorporated into the nucleus, and means for moving said carriages apart to elongate the heated nucleus.

3. A machine for making an object of quartz glass, comprising a pair of spaced carriages movable horizontally toward and from each other, a pair of blocks movable upon said carriages in a common vertical axial plane, a pair of axially alined shafts journaled in said blocks, means upon the facing ends of said shafts for engaging and supporting a nucleus of quartz glass between them, means for heating said nucleus to plastic state at one limit of movement of the nucleus, a receptacle for quartz powder adjacent the other limit of movement, means for simultaneously actuating said blocks to move said nucleus from said heating means into contact with said quartz powder, means for yieldingly mounting said receptacle so that the receptacle may yield in the direction of movement of said nucleus, means for simultaneously rotating said shafts, means for actuating said blocks to move said nucleus away from said quartz powder to said heating means so that the quartz powder accretion is fused and incorporated into the nucleus, and means for moving said carriages apart to elongate the heated nucleus.

4. A machine for making an object of quartz glass, comprising a pair of spaced carriages movable horizontally toward and from each other, a pair of blocks movable longitudinally of said carriages in a common vertical axial plane, a pair of axially alined shafts journaled in said blocks, means upon the facing ends of said shafts for engaging and supporting a nucleus of quartz glass between them, means for heating said nucleus to plastic state at one limit of movement of the nucleus, a receptacle for quartz powder adjacent the other limit of movement, means for simultaneously actuating said blocks to move said nucleus from said heating means into contact with said quartz powder, means for simultaneously rotating said shafts, means for actuating said blocks to move said nucleus away from said quartz powder to said heating means so that the quartz powder accretion is fused and incorporated into the nucleus, and means for moving said carriages apart to elongate the heated nucleus.

5. A machine for making an object of quartz glass, comprising a pair of spaced carriages movable toward and from each other and having threaded openings, a threaded shaft fitted in said openings so that rotation of said shaft moves said carriages toward and from each other, a pinion on said threaded shaft, a gear segment to mesh with said pinion to periodically rotate said shaft and move said carriages a predetermined distance, means for rotating said gear segment, a pair of axially alined rotatable supports on said carriages to support a nucleus of quartz glass between them, means for rotating said supports, and means for heating said nucleus to render the same plastic.

ROBERT F. SCHALLER.
WILLIAM J. LIDLE.